May 6, 1952  C. W. WALZ ET AL  2,596,060
SEEDER DRIVE ARRANGEMENT
Filed Jan. 24, 1946  3 Sheets-Sheet 1

INVENTORS
CLAUDE W. WALZ
HOWARD F. CLAUSEN
BY
ATTORNEYS.

May 6, 1952 — C. W. WALZ ET AL — 2,596,060
SEEDER DRIVE ARRANGEMENT
Filed Jan. 24, 1946 — 3 Sheets-Sheet 2

INVENTORS
CLAUDE W. WALZ
HOWARD F. CLAUSEN
BY
ATTORNEYS.

May 6, 1952   C. W. WALZ ET AL   2,596,060
SEEDER DRIVE ARRANGEMENT
Filed Jan. 24, 1946   3 Sheets-Sheet 3
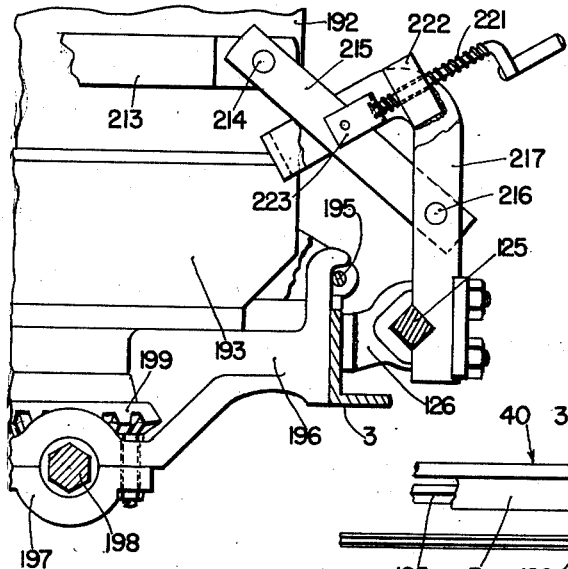
FIG. 4
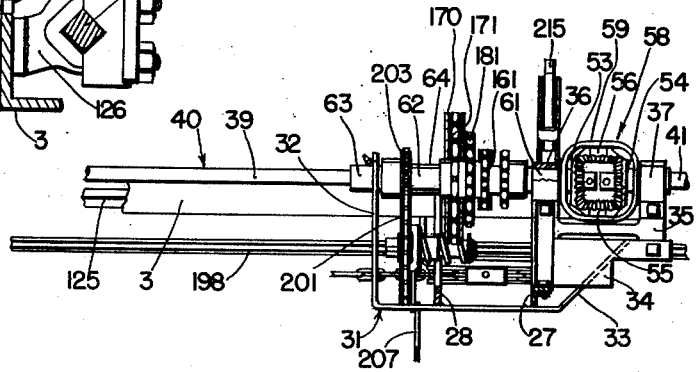
FIG. 6
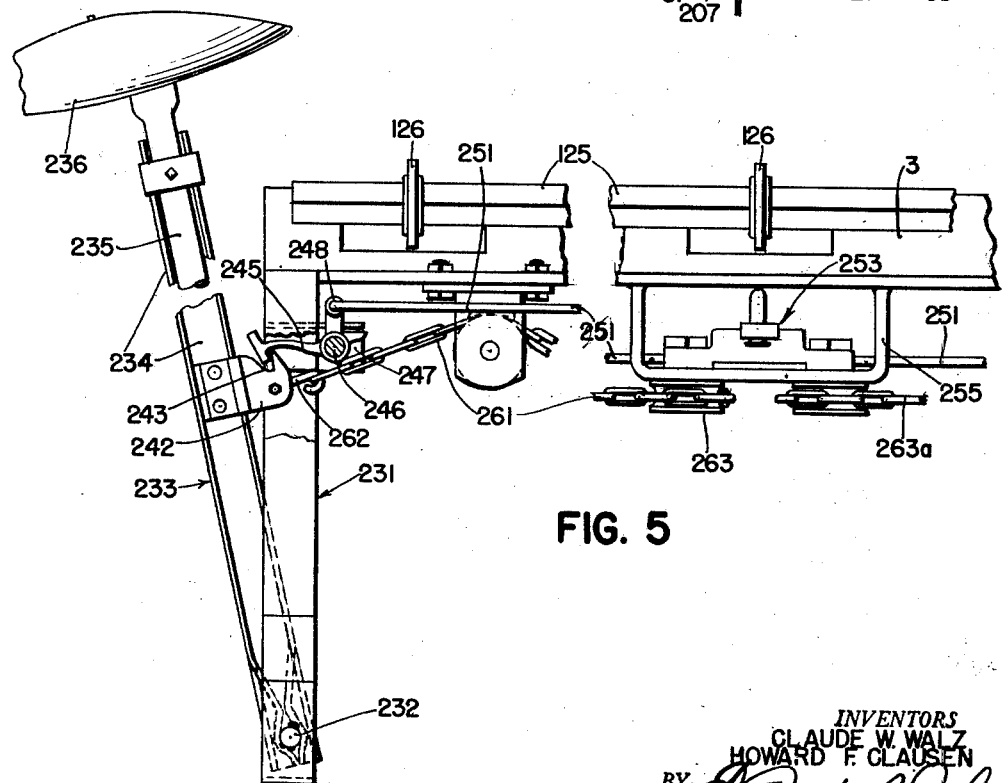
FIG. 5
INVENTORS
CLAUDE W. WALZ
HOWARD F. CLAUSEN
BY
ATTORNEYS.

Patented May 6, 1952

2,596,060

UNITED STATES PATENT OFFICE 2,596,060

SEEDER DRIVE ARRANGEMENT

Claude W. Walz, Rock Island, and Howard F. Clausen, Moline, Ill., assignors to Deere & Company, Moline, Ill., a corporation of Illinois Application January 24, 1946, Serial No. 643,016

1 Claim. (Cl. 275—9)

The present invention relates generally to agricultural implements and more particularly to planters and the like.

The object and general nature of the present invention is the provision of a towed planter or similar implement especially constructed and arranged for planting in a plurality of relatively closely spaced rows, as is desirable when planting beets, beans, and other crops. A further feature of this invention is the provision of a planter in which there are a plurality of independently shiftable planting units connected with the main frame of the planter along its forward part, with ground wheels supporting the main frame, and with the planting units, ground wheels, and other parts arranged for transverse adjustment along the frame so as to provide for varying the row spacing. More particularly, it is a feature of this invention to provide an implement of this kind in which the seed cans can be carried in a low position, one on each of the planting units, with the result that the seed passages from the seed dispensing mechanisms into the furrows may be made quite short. This materially improves the accuracy of planting, especially in the case of seeds that are very light, such as sugar beet seed.

Additionally, it is another feature of this invention to provide improved wheel frames for the ground wheels of the implement, so constructed and arranged as to provide for adequate support of the frame on the wheels but without interfering with any of the parts of the planting units, even in their most narrow setting. It is a further feature of this invention to provide improved operating and controlling connections between the ground wheels of the planter and the drive shaft for the several seeding units, and it is a further feature of this invention to provide for fertilizer dispensers, with new and improved driving and control connections for the latter, said driving connections being driven from a jackshaft that is carried by the planter generally above the ground wheels of the implement and driven from the latter.

These and other objects and advantages of the present invention will be apparent to those skilled in the art after a consideration of the following detailed description, taken in conjunction with the accompanying drawings in which the preferred form of the present invention has been illustrated.

In the drawings:

Figure 4 is a fragmentary sectional view taken at an enlarged scale generally along the line 4—4 of Figure 1;

Figure 5 is an enlarged fragmentary rear view showing the marker actuating and controlling mechanism; and Figure 6 is a fragmentary sectional view, taken generally along the line 6—6 of Figure 1, showing a portion of the drive gearing.

Figure 1:
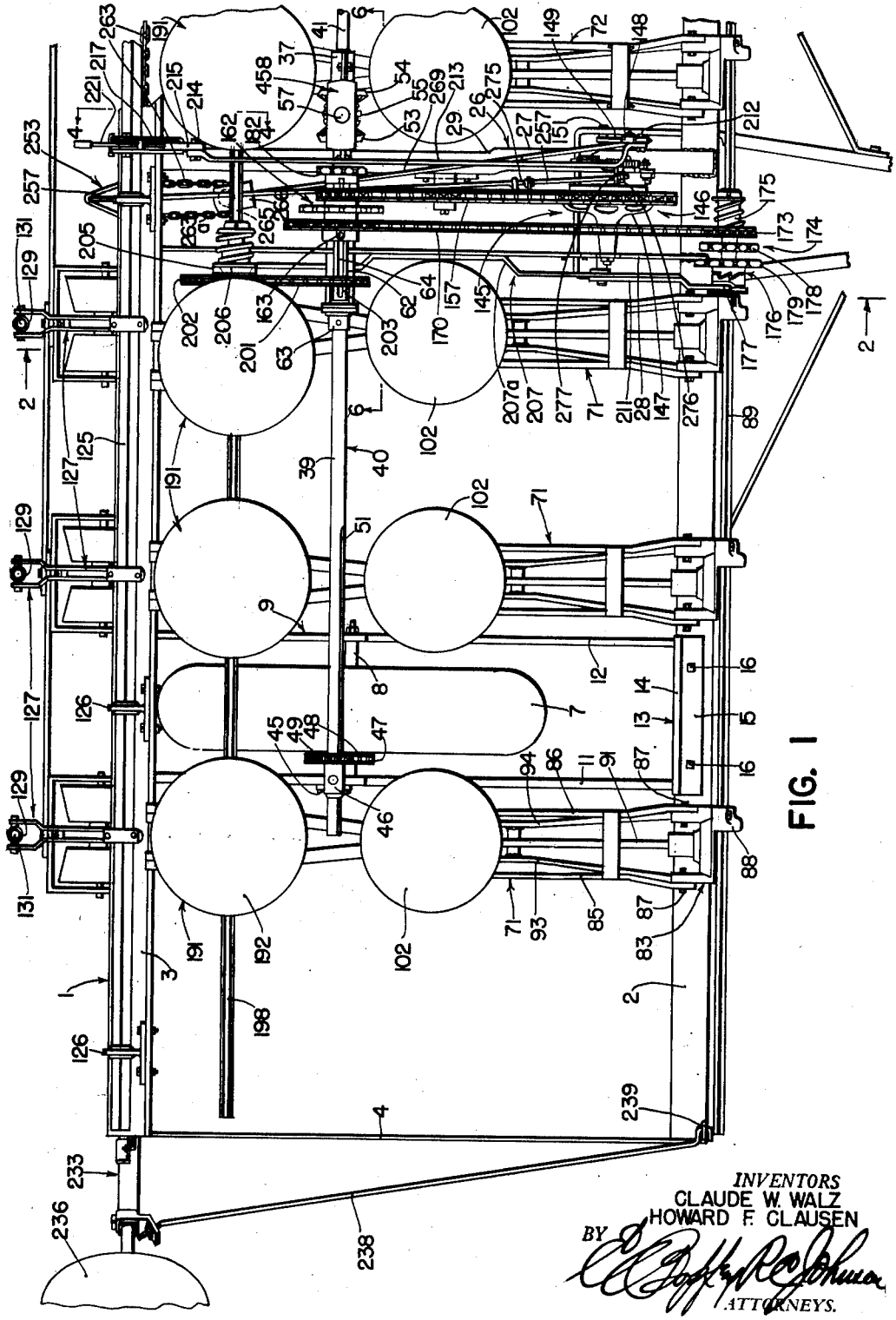
Figure 1 is a top or plan view of the major portion of a planter in which the principles of the present invention have been incorporated.
Figures 2, 3:
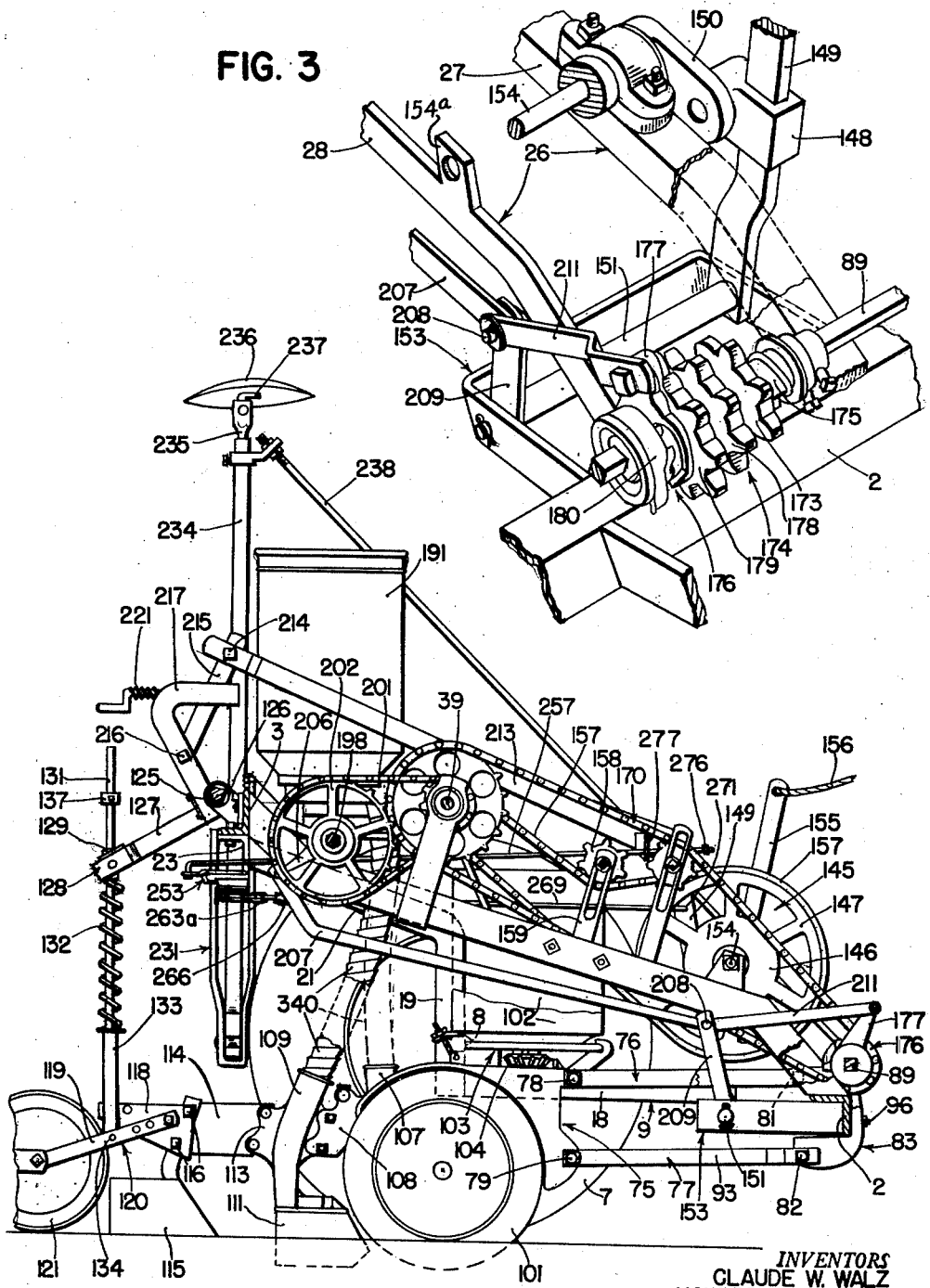
Figure 2 is a view taken generally along the line 2—2 of Figure 1.
Figure 3 is a fragmentary perspective view showing the drive for the seeding shaft and portions of the associated parts.

Referring now to the drawings, more particularly to Figures 1, 2 and 3, the main frame of the planter is indicated by the reference numeral 1 and comprises a front transverse frame bar 2, preferably in the form of an angle, and a rear transverse frame bar 3, also preferably in the form of an angle, connected together by longitudinally extending cross bars 4 at the ends of the frame 1 and by wheel frames and a power lift unit frame, referred to below in detail. As best shown in Figure 2, the front transverse frame bar 2 is materially lower than the rear transverse frame bar 3 so that, considering the frame 1 as a whole, it is disposed in a generally downwardly and forwardly extending plane. The frame 1 is supported on a pair of ground wheels 7, disposed between the ends of the frame 1. Each ground wheel 7 is mounted on an axle 8 (Figure 1) secured to a wheel frame 9. The latter unit comprises a pair of laterally spaced bars 11 and 12 connected together at their forward ends by an angle 13 to the vertical upwardly extending flange 14 of which the forward ends of the bars 11 and 12 are welded. The horizontal flange 15 of the angle 13 is secured, as by bolts 16, to the front frame angle 2, the latter having a plurality of openings to receive the bolts 16 in different positions of lateral adjustment. Each of the bars 11 and 12 making up each wheel frame 9 includes a horizontal section 18 (Figure 2), a vertical section 19 and an upwardly and rearwardly extending section 21, each of the sections 21 of the two frame bars 11 and 12 being secured, as by welding or the like, to the downwardly extending flange of an attachment angle 23 that is bolted to the rearwardly extending horizontal flange of the rear frame angle 3. In general, each of the wheel frame bars 11 and 12 constitutes an L-shaped member having a horizontal forward section which is disposed generally in the plane of the lower front frame angle 2, these forward portions being disposed so as to clear the adjacent seed cans of the planting units, as will be explained in detail below. The frame 1 also includes centrally thereof a power lift frame unit indicated in its entirety by the reference numeral 26 and comprising an angle 27 secured, as by welding, to the front frame angle 2 and bolted or otherwise fastened to the rear frame angle 3. The unit 26 includes a right hand frame member 28, preferably in the form of a strap member also welded at its front end to the frame angle 2 and bolted or otherwise fastened to the rear frame angle 3. The angle 27 includes a laterally offset section 29 so as to make the unit 26 as narrow as possible in order to clear the adjacent seed can, especially in the narrow setting of the planting units, as will be referred to below in detail.

As best shown in Figure 2, the axles 8 are connected with the wheel frame bars 11 and 12 just above the junction of the horizontal front section 18 with the vertically extending section 19. This disposes the major portions of the wheels below the general plane of the frame bars 2 and 3. As best shown in Figure 6, a yoke 31 is secured, as by welding, to the lower edges of the frame bars 27 and 28, the yoke including a vertically upwardly extending section 32 at the right side of the machine and, at the left side, an upwardly angled portion 33 to which a bracket plate 34 is welded. The plate 34 receives a casting 35 which carries or supports a pair of bearing units 36 and 37 in which the adjacent ends of a pair of shafts 39 and 41 are supported. The shaft sections 39 and 41, together with associated parts, form a jackshaft or drive shaft unit 40 which is driven from the two ground wheels 7. To this end, the laterally outer bars 11 of the two wheel frame units 9 carry an upwardly extending bracket 45 to the upper end of which a bearing unit 46 is connected, the right hand bearing unit 46 receiving the outer end of the shaft section 39 and the left hand bearing unit (not shown) receiving and supporting the left hand shaft section 41. A sprocket 47 is connected to be rotated by each of the wheels 7 and receives a driving chain 48 which at its upper end is trained over a sprocket 49 fixed to the outer end portion of the associated shaft section, 39 or 41. The sprocket 49 and the journal 46 slidingly receive the associated shaft section, each shaft section having a flattened portion 51 with which cooperate mating portions on the sprocket 49, whereby to establish the desired driving relation in different positions of lateral adjustment of the wheel frame and wheel. Secured to the adjacent inner ends of the two shaft sections 39 and 41 is a pair of differential gears 53 and 54, each being fixed to the associated shaft section and meshing with a pair of differential pinions 55 and 56 (Figure 6). The pinions 55 and 56 are mounted on studs 57 carried by or forming a part of a differential case 58 having bearing extensions which are supported in the journals 36 and 37. As best shown in Figure 6, the differential case 58 includes a yoke section receiving the gears 53, 54, 55 and 56, and the bearing section 61 (Figure 6) that is supported in the bearing 36 is extended laterally, as at 62, and at its right end is supported in a bearing 63 carried at the upper end of the vertical section 32 of the differential supporting yoke 31. The section 62 is ribbed, as at 64, to provide means for drivingly receiving a plurality of sprocket gears, as will be referred to below. Since the right hand ground wheel 7 drives the shaft section 39 and the left hand ground wheel (not shown) drives the left hand shaft section 41, it will be seen that the differential case 58 constitutes a member driven differentially from the ground wheels and forms a convenient means by which the drive to the power lift, the fertilizer dispensing mechanisms and the seeding units may be accomplished.

Referring now to Figures 1, 2 and 3, the right hand planting units are indicated by the reference numeral 71 and the left hand planting units by the reference numeral 72. Each planting unit includes a seed-fertilizer boot casting 75 having apertured lug sections to receive the rear ends of upper and lower link members 76 and 77. The upper and lower link members are pivotally connected, as at 78 and 79, respectively, to the boot 75, and at their forward ends the link members 76 and 77 are pivoted, as at 81 and 82, to the upper and lower portions, respectively, of a drawbar bracket 83. As best shown in Figure 1, the upper link member 76 comprises a pair of straps 85 and 86 rigidly connected together and at their forward ends pivoted, as at 87, to lateral portions of the associated bracket 83. The latter also supports, as by bearing sections 88, a transverse seeding shaft 89 which extends the length of the main frame. By means of pairs of bevel gears, the seed dispensing drive shaft sections 91 of the several planting units are driven from the seeding shaft 89. Each of the lower link members 77 comprises lower straps 93 and 94 suitably connected together and at their forward ends pivotally connected, as at 82, to the lower portion of the associated bracket 83. The brackets 83 may be shifted to different lateral positions along the frame bars 2 and to this end the latter are provided with a plurality of openings to receive bolts 96 or the like by which the brackets 83 may be fixed to the frame bar 2 in any selected position.

Each seed fertilizer boot 75 is provided with a pair of disk furrow openers 101 journaled thereon in any suitable manner, and each boot 75 also carries a seed can 102 in the lower portion of which a seed dispensing means 103 is disposed and is driven by means including gearing 104 (Figure 2) establishing a connection between the seed dispensing mechanism and the drive shaft 91. Each of the seed-fertilizer boots 75 is provided with a fertilizer passageway 107 and, rearwardly thereof, a bracket 108 which may, where desirable or necessary, receive an auxiliary fertilizer conduit 109 to which a separate fertilizer furrow opener 111 may be secured. Either of the fertilizer conduits 107 and 109 may receive a fertilizer tube, depending on whether it is desired to deposit the fertilizer in the furrow opened by the seed furrow openers 101 or in a separate furrow opened by the tool 111. Seed from the seed can 102 is delivered into the furrow opened by the disks 101 by any suitable means. The separate fertilizer conduit 109 has a rear apertured lug 113 which receives a bracket or plate 114 to which coverers 115 may be connected, as by bolts 116. The latter also receive plates 118 to which the straps 119 making up a press wheel frame 120 may be bolted. The rear ends of the straps 119 receive press wheels 121 of more or less conventional construction.

The planting units 71 are capable of independent vertical movement by virtue of their pivotal connection with the front frame angle 2, established by the parallel links 76 and 77. All of the planting units may be raised together out of operating position by means of a rockshaft 125 that is supported for rocking movement in brackets 126 carried by the rear frame angle 3. To this end, the rockshaft 125 is provided with a plurality of arms 127 having rear bifurcated ends 128 which receive a swivel 129 through which a lift rod 131 is disposed. A coil spring 132 is disposed about the rod 131 below the swivel 129 and at its lower end bears against the central portion of an inverted U-shaped yoke member 133 pivoted, as at 134, to the press wheel frame 120. The rod 131 at its lower end passes through an opening in the central portion of the associated yoke 133 and has a collar, head or the like (not shown) by which the planting unit may be raised by lifting upwardly on the rod 131. At its upper end each of the rods 131 carries a set screw collar 137 so that when the rockshaft 125 is rocked forwardly, all of the arms 127 are raised and the swivel member 129 carried by each arm comes into contact with the set screw collar 137 on the associated lift rod 131, whereby further upward movement of the arms 127 serves to raise all of the planting units. The mechanism for rocking the rockshaft 125 will be described later.

Mounted on the centrally disposed frame unit 26 is a power lift unit 145 which is substantially the same as the power lift unit disclosed and claimed in the United States Patent No. 2,376,464, issued May 22, 1945 to Charles H. White, to which reference may be made if necessary. Briefly, the power lift unit comprises a self-interrupting clutch and an operating linkage constructed in the form of a Whitworth quick return motion. The self-interrupting clutch is indicated at 146 and comprises a driving member 147, a driven member in the form of a crank 150 rotatable about the axis of the driving member 147 and including a slide 148 which operates along a generally vertically extending arm 149 fixed at its lower end to a shaft 151 (Figures 1 and 2) which is carried in a U-shaped sub-frame 153 generally below the frame bars 27 and 28 and welded at its forward end portions or otherwise secured to the front frame angle 2. The driving and driven members 147 and 150 are mounted for rotation about a shaft 154, the right end of which is fixed, as by a nut or the like, to a lug 154a on the right hand frame member 28. A trip lever 155, to which a cable 156 that extends to the operator's station on the tractor is connected, serves to control the operation of the self-interrupting clutch 146. The driving member 147 of the clutch is driven by a sprocket chain 157 which, as best shown in Figure 2, is trained over an idler 158 supported adjustably by a bracket 159 fixed to the frame bar 27. At its rear end the sprocket chain 157 is trained over the smaller gear 161 (Figure 6) of a compound sprocket member 162, shown as incorporating three sprocket gears. The member 162 is supported adjustably along the ribbed portion 64 of the differential driving sleeve 62 and may be locked in place by a set screw 163 or other suitable means. As mentioned above, the sleeve 62 is driven from the two ground wheels supporting the planter frame, through the drive shaft sections 39 and 41 and the associated differential gearing described above. As best shown in Figure 1, a chain 170 is disposed over the large section 171 (Figure 6) of the compound sprocket gear member 162, and the lower end of the chain 170 is trained over a small sprocket section 173 of a compound sprocket gear member 174 that is mounted rotatably on a sleeve 175 carried by the central portion of the seeding shaft 89. The gear member 174 is shiftable along the sleeve member 175 and its driving connection therewith is controlled by a clutch 176, and the clutch 176 is controlled by a rockable cam arm 177. The compound sprocket gear member 174 also includes an intermediate size sprocket 178 and a large size sprocket 179, either of which may also receive the seeding shaft drive chain 170. The cam member 177 cooperates with a stationary cam member 180 held against rotation in any suitable way, as by contacting the angle 2 or some other part of the planter frame.

The unit 174, together with the clutch 176 and other parts, may be disposed in different positions laterally along the seeding shaft 89 so as to bring the desired sprocket member, 173, 178 or 179, into the plane of the chain 170, as shown in Figure 1. Likewise, the gear member 162 may be shifted on the sleeve 62 laterally in one direction or the other so as to bring either the large sprocket section 171, the small sprocket section 161, or an intermediate sprocket section 181 into the plane of the chain 170 (Figure 1) so as to provide for connecting the chain 170 between the drive shaft 40 and the seeding shaft 89 to provide nine different speeds. When the unit 162 is shifted so as to bring the smaller gear 161 into a position to receive the chain 170, an auxiliary sprocket member 182 (Figure 1) is slid over into the plane of the power unit drive chain 157, the latter being taken off the sprocket 161 under the conditions just mentioned and engaged with the auxiliary sprocket 182.

By virtue of arranging the sprocket members 162, 174 and 182 so that the different drives may be provided for without shifting the chains 170 and 157 from their planes of operation, as shown in Figure 1, the power unit 145 may be left in its position and, moreover, the planter units may be brought fairly close together so as to provide for narrow row spacing, without having the cans interfere with the chains or vice versa. It will be understood that rocking the cam arm 177 forwardly will disengage the clutch 176 and rocking the arm 177 rearwardly will cause the clutch 176 to engage. A clutch construction of this kind is largely conventional.

A plurality of fertilizer units 191 are provided, each including a fertilizer can 192 supported on a base 193 (Figure 4) which is hinged, as at 195, to a supporting bracket 196 which is fixed in any suitable manner to the rear frame angle 3. The brackets 196 are provided with bearing sections 197 which are in alignment when the fertilizer units are mounted on the planter frame, and a through fertilizer drive shaft 198 is received and supported by the several bearing sections 197. The fertilizer shaft 198 carries a plurality of pinions, one for each of the fertilizer units 191, each unit having a fertilizer distributor drive gear 199 which is driven by the associated drive pinion on the shaft 198. The fertilizer drive shaft 198 is driven from the drive shaft 40 by a chain 201 trained at its forward end over a sprocket member 203 fixed to the differentially driven member 62. At its rear end the fertilizer drive chain 201 is trained over a sprocket 202 which is connectible to and disconnectible from the fertilizer drive shaft 198 by clutch means 205 under the control of a cam arm 206. The clutch and cam control therefor is substantially the same as the clutch mechanism 176 and associated parts mentioned above. The arm 206 extends generally downwardly and is connected to the rear end of a longitudinally extending actuating link 207 (Figure 2) which at its forward end is connected, as at 208, to the upper end of an arm 209 which is secured, as by welding or the like, to the right end of the shaft 151, the left end of which is fixed to the power lift clutch device 145. A forward link 211 is connected at its rear end to the pivot 208 that connects the front end of the link 207 to the arm 209, and the front end of the link 211 is connected to the upper end of the upwardly extending cam arm 177 that controls the seeding shaft clutch 176. The upper end of the power lift actuated arm 149 carries a pivot 212 (Figure 1) by which the forward and laterally bent end of a longitudinally extending link 213 is connected thereto. The rear end of the link 213 is connected by a pivot 214 (Figures 1 and 2) carried on an adjusting arm 215 (Figure 4) pivoted, as at 216 to an arm 217 that is fixed to the rockshaft 125. A crank screw 221 is threaded through a block 222 that is fixed to the arm 217, and the forward end of the crank screw 221 is connected by a yoke 223 to the adjusting arm 215, the end of the crank screw being rotatable in the yoke 223 so that by turning the crank screw the position of the adjustable arm 215 relative to the rockshaft arm 217 may be varied, as desired. Since the power lift device 145 operates to swing the arm 149 through a given or predetermined stroke, it will be seen that fore and aft movement of the upper end of the arm 149 acts through the arm 217 and adjustable arm 215 to rock the rockshaft 125 and thus raise and lower the tools. By turning the crank screw 221 when the arm 149 is in its lowered or operating position, as shown in Figure 2, the amount of pressure exerted downwardly through the springs 132 by the several arms 127 may be varied or adjusted as desired.

As best shown in Figures 1, 2 and 5, at each end of the rear frame angle 3 there is a depending marker arm supporting bracket 231 fixed at its upper end in any suitable manner, as by welding, to the angle 3. At its lower end, each of the marker arm brackets 231 receives a pivot pin 232 on which the lower or inner end of a marker arm 233 is pivotally received. Each marker arm 233 includes a channel member 234 and an adjustable shaft section 235, at the outer end of which a marker disk 236 is journaled, as by a journal bracket 237 (Figure 2). The marker arm is reenforced by a diagonally extending rod 238 (Figure 2) pivotally connected at its forward or inner end, as at 239, to the end of the front frame angle 2. Each marker arm carries a detent bracket 242 having a notch portion which receives the outer end of a detent 245 pivoted, as at 246, to an angle bracket 247 welded or otherwise fixed to the adjacent marker arm standard 231. An operating arm 248 forms a part of the detent 245 and receives the outer end of a latch operating rod 251 that extends laterally inwardly. Each of the latch controlling rods 251 is operated by a latch control unit 253 which is substantially the same as the corresponding latch control unit shown in the above-identified White patent. According to the present invention, the latch control unit 253 is supported on a bracket 255 mounted on the underside of the angle 3, being secured thereto, as by welding or the like. Since the latch control unit 253 is the same as the latch control unit of the above-identified White patent, it is unnecessary to describe the details of this unit. It therefore suffices to note that by virtue of this unit the oscillations of a latch control rod member 257 (Figures 1 and 2) when moved forward and then back to the position shown in Figure 1, serves to permit the detent 245 at one side of the planter to hold the associated marker arm in an elevated position and at the other side of the planter to move that detent out of arm-holding position so that that arm may be lowered into operation. However, the arms 233 are raised and lowered concomitantly with the raising and lowering of the planting units 71, and to this end a chain 261 is connected at its outer end, as by a hook 262, to the bracket 242 on each marker arm. The chain 261 extends inwardly, passing over an associated sheave 263 supported on the bracket 255 and passes forwardly, as indicated in Figure 1, where it passes around a sheave 265 carried by a yoke 266 and is joined to and forms a part of the chain section 263a that extends to the other marker arm. The yoke 266 is connected to the rear end of a marker operating rod 269 (Figure 1) that is connected, as at 271 (Figure 2), to the power operated arm 151. The forward end of the latch control rod 257 carries a pair of stops 275 and 276 on opposite sides of an apertured lug 277 which is fixed to the forward end of the link 213 so as to be operated whenever the arm 151 and the link 213 are operated by the clutch 145. Thus, whenever the arm 151 is shifted forwardly from the position shown in Figure 2, a pull is exerted through the link 213 to rock the rockshaft 125 and raise the planting units 71, and at the same time a pull is exerted through the rod 269 and the chains 263 to raise both of the markers. Also, a forward pull is exerted through the rod 257, which serves to permit one of the marker arm latches or detents 245 to engage the associated marker arm 233 and lock it in its raised position, positively disengaging the other marker arm latch or detent 245 so that when the arm 151 is subsequently moved rearwardly to lower the tools the marker arm whose detent is held in a released position lowers into an operating position while the other marker arm is held in a raised or inoperative position. This is substantially the action of the marker control mechanism shown in the above-identified White patent.

It will be noted, particularly from Figure 1, that where the planting units 71 are spaced fairly close together, the disposition of the drive shaft 40 and the vertical drive chains 48 in the position rearwardly of the seed cans 102 accommodates a close spacing of the latter and, looking at Figure 2, it will be seen that the wheel frame bars 11 and 12 are placed in a low down position, the portions 18 thereof actually passing under the adjacent parts of the seed cans 102. It will also be noted from Figure 1 that the link 207, extending between the actuating arm 209 (Figure 2) and the fertilizer drive shaft controlling clutch arm 206, is offset laterally inwardly, as indicated at 207a in Figure 1, so as to provide adequate clearance for the adjacent seed can 102. It will also be noted from Figure 1 that the fertilizer can 191 adjacent the clutch 205 is disposed in a slightly laterally outwardly offset position so as to prevent interference between the lower portion of the fertilizer can 191 and the sprocket 202.

A fertilizer tube 340 leads downwardly from the fertilizer hopper bottom 193 and may be connected, as shown in dotted lines in Figure 2, into the fertilizer conduit 107 when it is desired to deposit the fertilizer in the same furrow with the seed. However, when it is desired to deposit the fertilizer in a separate furrow, preferably alongside but spaced from the seed furrow, the lower end of the fertilizer tube 340 is disposed in the auxiliary fertilizer spout section 109 (Figure 2).

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

In a planter, a frame, a drive shaft mounted thereon adjacent the rear of the frame, a seeding shaft adjacent the front portion of the frame, a power lift clutch, a compound gear member mounted slidably on said drive shaft, a second compound gear member slidably mounted on said seeding shaft, an auxiliary gear member on said drive shaft adjacent said compound gear member thereon, said auxiliary gear member having the same diameter as the adjacent section of said second compound member, a drive chain trained over selected sections of said compound gear members for driving said seeding shaft from said drive shaft, each of said compound gear members being slidable on said shafts to accommodate engaging the drive chain with selected sections of said gear members while said drive chain remains in the same position relative to said frame, and a power lift drive chain for driving said power lift clutch and engageable with said auxiliary gear member when said first drive chain is engaged with said adjacent section.

CLAUDE W. WALZ.
HOWARD F. CLAUSEN.

REFERENCES CITED

The following references are of record in the file of this patent:

UNITED STATES PATENTS

| Number | Name | Date |
|---|---|---|
| 661,502 | Ditzler | Nov. 13, 1900 |
| 693,584 | Brunnemer | Feb. 18, 1902 |
| 879,710 | Wilkin | Feb. 18, 1908 |
| 999,151 | Butler | July 25, 1911 |
| 1,019,038 | Gilroy | Mar. 5, 1912 |
| 1,045,624 | Sorenson | Nov. 26, 1912 |
| 1,290,090 | Cole | Jan. 7, 1919 |
| 1,363,786 | Hey | Dec. 28, 1920 |
| 1,429,280 | Godfrey | Sept. 19, 1922 |
| 1,452,286 | Bozard et al. | Apr. 17, 1923 |
| 1,514,700 | Harris | Nov. 11, 1924 |
| 1,652,925 | Berry | Dec. 13, 1927 |
| 1,897,355 | Altgelt | Feb. 14, 1933 |
| 1,911,218 | White | May 30, 1933 |
| 1,944,381 | Wamhoff | Jan. 23, 1934 |
| 2,031,640 | Geraldson | Feb. 25, 1936 |
| 2,033,366 | White | Mar. 10, 1936 |
| 2,085,354 | Erickson | June 29, 1937 |
| 2,106,901 | Rassmann | Feb. 1, 1938 |
| 2,178,716 | Botnen | Nov. 7, 1939 |
| 2,311,993 | Olsen | Feb. 23, 1943 |
| 2,337,662 | Johnson | Dec. 28, 1943 |
| 2,339,689 | Englund | Jan. 18, 1944 |
| 2,368,134 | Haas | Jan. 30, 1945 |
| 2,376,464 | White | May 22, 1945 |